(12) United States Patent
Toyofuku

(10) Patent No.: US 7,605,937 B2
(45) Date of Patent: Oct. 20, 2009

(54) PRINTING CONTROL METHOD, CONTROL DEVICE, AND PRINTING SYSTEM

(75) Inventor: Takashi Toyofuku, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 775 days.

(21) Appl. No.: 10/935,274

(22) Filed: Sep. 8, 2004

(65) Prior Publication Data

US 2005/0057767 A1    Mar. 17, 2005

(30) Foreign Application Priority Data

Sep. 12, 2003    (JP)    ............................. 2003-321030

(51) Int. Cl.
  *G06F 15/00*    (2006.01)
  *G06F 3/12*     (2006.01)
  *G06K 1/00*     (2006.01)
(52) U.S. Cl. .................................... 358/1.15; 358/1.13
(58) Field of Classification Search ................ 358/1.15, 358/1.1, 1.13, 1.14, 1.18
See application file for complete search history.

(56) References Cited

U.S. PATENT DOCUMENTS

| | | | |
|---|---|---|---|
| 6,433,885 B1 * | 8/2002 | Verghese et al. | ........... 358/1.15 |
| 6,885,474 B2 * | 4/2005 | Kimura | ....................... 358/1.9 |
| 7,061,635 B1 * | 6/2006 | Wanda et al. | .............. 358/1.15 |
| 7,097,270 B2 * | 8/2006 | Yamazaki | ..................... 347/19 |
| 2005/0111016 A1 * | 5/2005 | Yoneyama et al. | ........... 358/1.9 |

FOREIGN PATENT DOCUMENTS

JP    05-073232 A    3/1993

* cited by examiner

*Primary Examiner*—Douglas Q Tran
(74) *Attorney, Agent, or Firm*—Sughrue Mion, PLLC

(57) ABSTRACT

The present invention provides a highly productive printing system and a simple printing device included therein. Correcting data for correcting a printing state of an image are prepared for at least each of the printing devices and stored in a printer server. In the printer server, printing data input from a terminal device is converted into bit map data via an RIP processor, and the bit map data is transmitted from the printer driver to two of the same kind of printing devices. At this time, the printing device selects data corresponding to the respective printing devices and transmits them with the bit map data. When the printing devices print the transmitted bit map data, they correct the printing state based on the correcting data transmitted together with the bit map data.

19 Claims, 8 Drawing Sheets

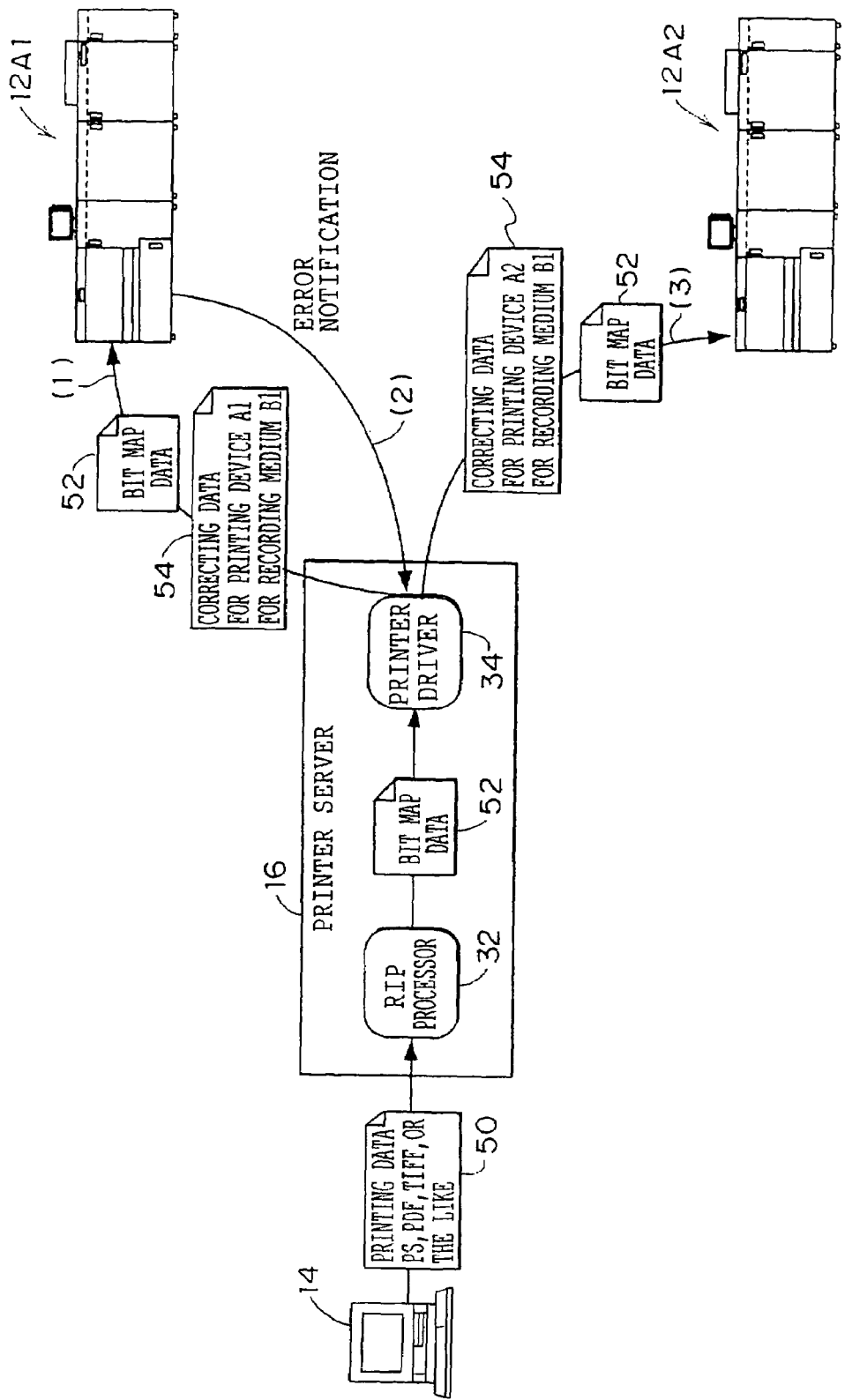

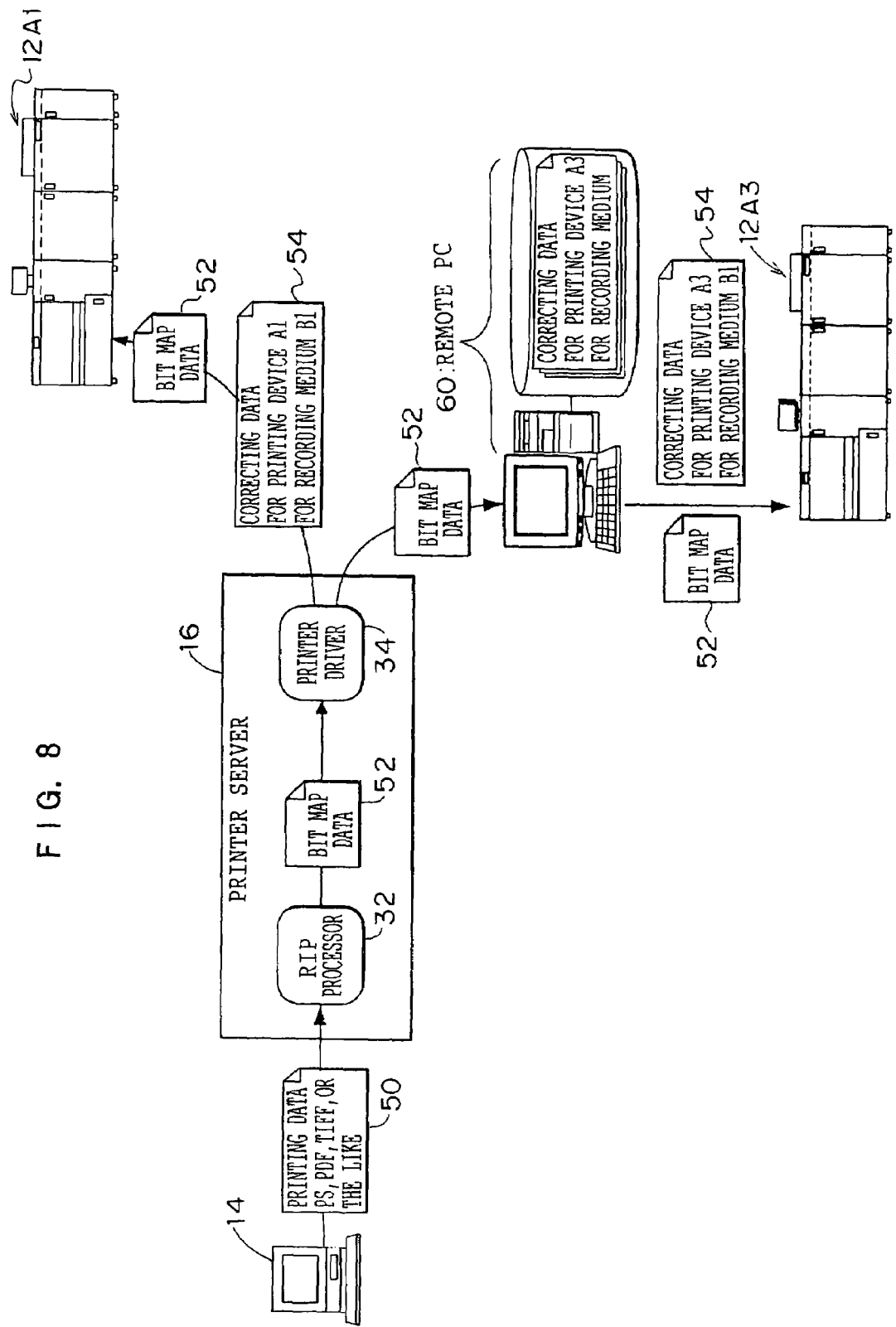

PRINTING CONTROL METHOD, CONTROL DEVICE, AND PRINTING SYSTEM

CROSS-REFERENCE TO RELATED APPLICATION

This application claims priority under 35 USC 119 from Japanese Patent Application No. 2003-321030, the disclosure of which is incorporated by reference herein.

BACKGROUND OF THE INVENTION

1. Field of the Invention

The present invention relates to a printing control method, a control device, and a printing system. Specifically, the invention relates to a printing control method that utilizes a control device connected to multiple printing devices that print images on recording media. The printing devices print the images based on printing data. The present invention also relates to a control device to which the printing control method is applicable, and a printing system.

2. Description of the Related Art

Conventionally known printing systems involve multiple printing devices arranged in a network. In this kind of printing system, a technique has been proposed in which the printing devices execute one printing job in a parallel manner in order to improve productivity (see Japanese Patent Application Laid-Open (JP-A) No. 5-73232).

When the parallel process is executed in the printing devices, for example, if a printing job is such that one image is printed to be output on multiple pieces of paper, one image is printed by all of the printing devices so that multiple printed results of the image can be instantly obtained. In the case of a printing job in which multiple pages are printed and output, the printing devices that print and output the pages can be switched. For example, if the printing devices are switched per page according to monochrome or color, the printing results of multiple pages can be instantly obtained. When the parallel process is executed by the printing devices, it is preferable that image outputs with uniform quality can be obtained.

Nonetheless, the finish effects of the images, such as color shade and printing condition such as image recorded positions on recording media such as paper, differ from printing device to printing device. For this reason, with devices in conventional printing systems, it is necessary to take the printing condition of each image into consideration and execute a Raster Image Processor (RIP) process on the printing data so as to convert the printing data into bit map data.

When performing the parallel process, the RIP process must be executed on the same printing data in each of the printing devices, thereby lowering productivity. Further, since functions for executing the RIP process are required in the printing devices, this prevents the printing devices from being simplified. Particularly, data such as character fonts need to be preinstalled for the RIP process, and this kind of data is expensive. As a result, providing printing devices with functions for executing the RIP process is disadvantageous in terms cost.

SUMMARY OF THE INVENTION

The present invention is devised in order to solve the above problem, and its object is to improve productivity in a printing system having a plurality of printing devices and enable simplification of the printing devices.

In order to achieve the above object, a first aspect of the invention is to provide a printing control method of making a plurality of printing devices, for printing an image on a recording medium print an image based on printing data representing the image to be printed with a control device connected to the printing devices, wherein a plurality of correcting data for correcting a printing state of the image at the time of printing are obtained and prestored for each of the printing devices, when the printing data are input from an external source, the input printing data are converted into data with a data format capable of being printed by the printing devices, correcting data related to a printing device to print the image based on the printing data are selected from the stored correcting data, and the converted printing data and the selected correcting data, or the corrected printing data which are obtained by correcting the converted printing data based on the selected correcting data are transmitted to the printing device to print the image based on the printing data.

According to the printing control method, when the printing device is made to print the image based on the printing data input from the external source, the input printing data are subject to an RIP process, so as to be converted into data with a format capable of being printed by the printing device. The correcting data related to the printing device to print the image are selected from the prestored correcting data for correcting the printing state for each of the printing devices. The printing device to print the image may be all the printing devices connected to the control device, or the printing device to print an image may be selected from the printing devices. When the printing device to print the image is selected, the printing device to be selected may be specified from the external source, or a printing device which is suitable for printing the printing data may be automatically selected.

Since the converted printing data and the selected correcting data are transmitted to the printing device to print the image, the printing device can be made to correct the printing state based on the correcting data at the time of printing the image based on the converted printing data. In another manner, after the converted printing data are corrected based on the selected correcting data, the corrected printing data are transmitted, so that the printing device can print the image based on the corrected printing data.

That is to say, the printing data are converted into data with a format capable of being printed by the printing device, and the converted printing data as well as the correcting data related with the printing device are transmitted, or the printing data are corrected based on the correcting data so as to be transmitted. As a result, the printing state of the image can be corrected without data conversion such as the RIP process executed by the printing devices. As a result, a function for the data conversion is eliminated from the printing device, so that the printing device can be simplified. Further, even when the printing devices execute the parallel process, printed results in uniform quality which are corrected according to the printing states of the image in each of the printing devices can be obtained without the data conversion such as the RIP process in the printing devices. For this reason, productivity can be improved.

The printing control method can be realized by using a control device from a second aspect of the invention which is constituted in the following manner. That is to say, a control device which is connected to a plurality of printing devices for printing an image on a recording medium and controls the printing devices to print the image based on printing data representing the image to be printed input from an external source, includes: a conversion component for converting the printing data into data with a data format capable of being printed by the printing devices; a storage component for obtaining and storing a plurality of correcting data for correcting a printing state of the image at the time of printing for each of the printing devices; a selection component for selecting correcting data related with the printing devices to print the image based on the printing data from the correcting data stored in the storage component; and a data transmission component for transmitting the printing data converted by the conversion component and the correcting data selected by the selection component, or the corrected printing data which are obtained by correcting the printing data converted by the conversion component based on the correcting data selected by the selection component to the printing devices to print the image based on the printing data.

In the control device, the conversion component executes the RIP process on the printing data input from the external source so as to convert them into data with a format capable of being printed by the printing devices. The selection component selects correcting data related with the printing device to print the image from the correcting data which are obtained for each of the printing devices and are stored in the storage component. The printing data converted by the conversion component as well as the correcting data selected by the selection component are transmitted from the data transmission component to the printing device to print the image. In another manner, the printing data converted by the conversion component are corrected based on the correcting data selected by the selection component, so as to be transmitted to the printing device to print the image by the data transmission component.

As a result, similarly to the first aspect of the invention, the printing state of the image can be corrected without data conversion such as the RIP process executed by the printing devices. As a result, a function for the data conversion is eliminated from the printing device, so that the printing device can be simplified. Further, even when the printing devices execute the parallel process, printed results with uniform quality which are corrected according to the printing states of the image in the printing devices can be obtained without the data conversion such as the RIP process in the printing devices. For this reason, the productivity can be improved.

The printing device to print the image may be all the printing devices connected to the control device, or the printing device to print an image may be selected from the printing devices. When the printing device to print the image is selected, the printing device to be selected may be specified from the external source, or a printing device which is suitable for printing the printing data may be automatically selected.

In the control device, when the printing devices are made to print the image based on the printing data in a parallel process, the selection component selects the same kind of printing devices from the printing devices as the printing devices to print the image based on the printing data, and selects the correcting data for each of the selected printing devices.

As a result, by making the printing devices execute the parallel process, printed results having the same quality which are corrected according to the printing states can be obtained, and the same kind of printing devices are selected as the printing devices to print the image in the parallel process. For this reason, the printing devices which execute the parallel process may make the data conversion in common, and the converted printing data obtained as the result may be transmitted to the printing devices. In other words, since each of the printing devices need not to make the data conversion, a processing load on the control device can be reduced.

The same kind of printing devices can use the same converted data, namely, they are uniform in the print engines, specifically in resolution, tone resolving power, and the like.

In the control device, when an error occurs in a printing device to print the image based on the printing data, the selection component can select a printing device which has the same type as the printing device where the error occurs as substitute of the printing device where the error occurs, and select correcting data related with the printing device selected as substitute. Further, the data transmission component can transmit the converted printing data and the correcting data related with the printing device selected as the substitute, or the corrected printing data which is obtained by correcting the converted printing data based on the correcting data related with the printing device selected as the substitute to the printing device selected as the substitute.

As a result, even when an error occurs in a printing device, another printing device with the same type as the printing device where the error occurs is selected. The printing process which should be executed by the printing device where the error occurs is executed alternatively by the selected printing device, so that the error can be recovered automatically. Further, when the printing device with the same kind as the printing device where the error occurs is selected, the converted data transmitted to the printing device where the error occurs can be used for printing by the selected printing device. That is to say, it is not necessary to again make the data conversion for the selected printing device, the processing load on the control device can be reduced.

The printing device with the correcting function and the printing device without the correcting function are occasionally present in a mixed manner as the printing devices connected to the control device. For this reason, in the control device, the data transmission component determines whether the printing devices to print the image based on the printing data have a correcting function for correcting the printing state based on the correcting data. When the printing devices to print the image based on the printing data have the correcting function, the converted printing data can be transmitted and the selected correcting data, and when the printing devices to print the image based on the printing data do not have the correcting function, the converted printing data can be transmitted.

As a result, the converted printing data and the correcting data are transmitted to the printing devices having the correcting function, so that the printing devices can correct the printing states. The printing data corrected based on the correcting data are transmitted to the printing devices without the correcting functions. For this reason, only when the printing devices print the corrected printing data, a printed output where the printing state is corrected can be obtained. Thus, according to presence/absence of the correcting function in the printing device to print the image switching is made between transmission of the converted printing data and the correcting data and transmission of the converted printing data corrected based on the correcting data. As a result, even when the printing devices with the correcting function and the printing devices without the correcting function are present in a mixed manner, the printed output where the printing states are corrected based on the correcting data related with the printing devices can be obtained from the printing devices. Further, since the converted printing data are corrected based on the correcting data only at the time of transmission to the printing devices without the correcting function, the processing load on the control device is reduced.

The printing state varies with types of recording media to be used for printing in one printing device, but the level of the difference is smaller than that of the printing states in each of the printing devices. In the control device, the storage component obtains the correcting data for each of the printing devices and every type of the recording media so as to prestore them therein, and the selection component selects the correcting data related with the printing devices to print the image based on the printing data and the recording media used for the printing. As a result, the printing state can be corrected more accurately.

A printing system in a third aspect of the invention connects a plurality of printing devices to print an image on recording media to the control device in the second aspect of the invention.

According to this printing system, when printing data are input from an external source, the control device executes an RIP process on the printing data so as to convert them into data with a format capable of being printed by the printing devices. Correcting data related with the printing device to print the image are selected from the correcting data for correcting printing states of the printing devices stored in a storage component. The converted printing data as well as the correcting data are transmitted to the printing device to print the image, or the converted printing data are corrected based on the selected correcting data so as to be transmitted to the printing device to print the image.

As a result, similarly to the first aspect of the invention, the printing state of the image can be corrected without data conversion such as the RIP process executed by the printing devices. Thus, a function for the data conversion is eliminated from the printing device, so that the printing device can be simplified. Further, even when the printing devices execute the parallel process, printed results with uniform quality which are corrected according to the printing states of the image in the printing devices can be obtained without the data conversion such as the RIP process in the printing devices. For this reason, the productivity can be improved.

According to the invention, the correcting data for correcting the printing states of the image obtained for each of the printing devices are prestored, and the printing data are subject to the RIP process so as to be converted into data with a format capable of being printed by the printing devices. The converted printing data as well as the correcting data related with the printing devices are transmitted, or the converted printing data are corrected based on the correcting data related with the printing devices so as to be transmitted. For this reason, the printing states of the image can be corrected without the data conversion such as the RIP process in the printing devices, thereby improving the productivity in the printing system having the printing devices and simplifying the printing devices.

BRIEF DESCRIPTION OF THE DRAWINGS

FIG. 7 is a conceptual diagram for explaining the operation of the printer server when an error occurs in the printing device.

FIG. 8 is a diagram for explaining a printing system according to another embodiment of the invention.

DETAILED DESCRIPTION OF THE INVENTION

One example of an embodiment of the present invention is explained in detail below with reference to the drawings.

Figure 1:
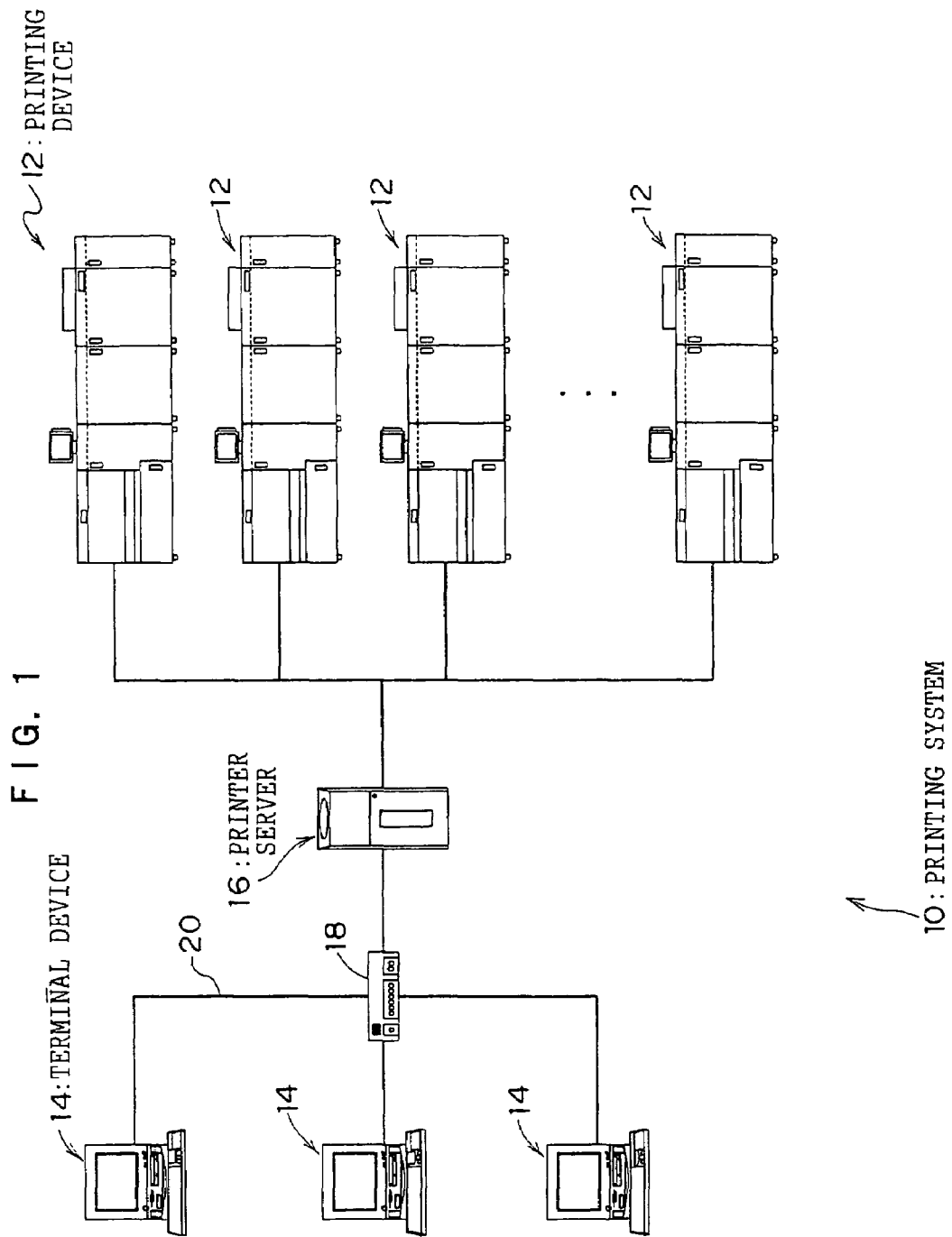
FIG. 1 is a diagram illustrating the overall configuration of a printing system according to an embodiment of the present invention.

As shown in FIG. 1, a printing system 10 according to the embodiment has a plurality of printing devices 12, a plurality of terminal devices 14, and a printer server 16. The printing devices 12 print an image on a predetermined recording medium. The terminal devices 14 are operated by the user in order to create data to be printed and instruct printing of the created printing data. The printer server 16 manages the printing devices 12 so that they can be shared or commonly used by multiple terminal devices 14.

The printing devices 12 and the printer server 16 are connected with each other so as to be capable of transmitting/receiving various data. The printer server 16 is connected to a network 20 (e.g., LAN, Internet, or the like) that is connected to the terminal devices 14 via a hub 18.

Standard personal computers (PCs) can be used as the terminal devices 14. The terminal device 14 creates data such as documents and plotting images using various applications. The data generally has a data format that is dependent on the corresponding applications. When the user instructs to print, the terminal device 14 converts the data to be printed from a data format that is dependent on an application into printing data having a format independent from the application (for example, PS, PDF, TIFF or the like). Further, the terminal device 14 transmits the printing data and condition data, which represents various setting conditions for when an image based on the printing data is printed, as a printing job 50 (see FIGS. 5 to 7) to the printer server 16.

The condition data include information on image resolution, information for specifying the type of recording medium (for example, plain paper, coated paper, or the like), and size (for example, A4, B5, or the like), and information for specifying the number of prints. The condition data also includes information on monochrome or color printing, information for specifying a printing device, and information on parallel processing, and the like.

Figure 2:
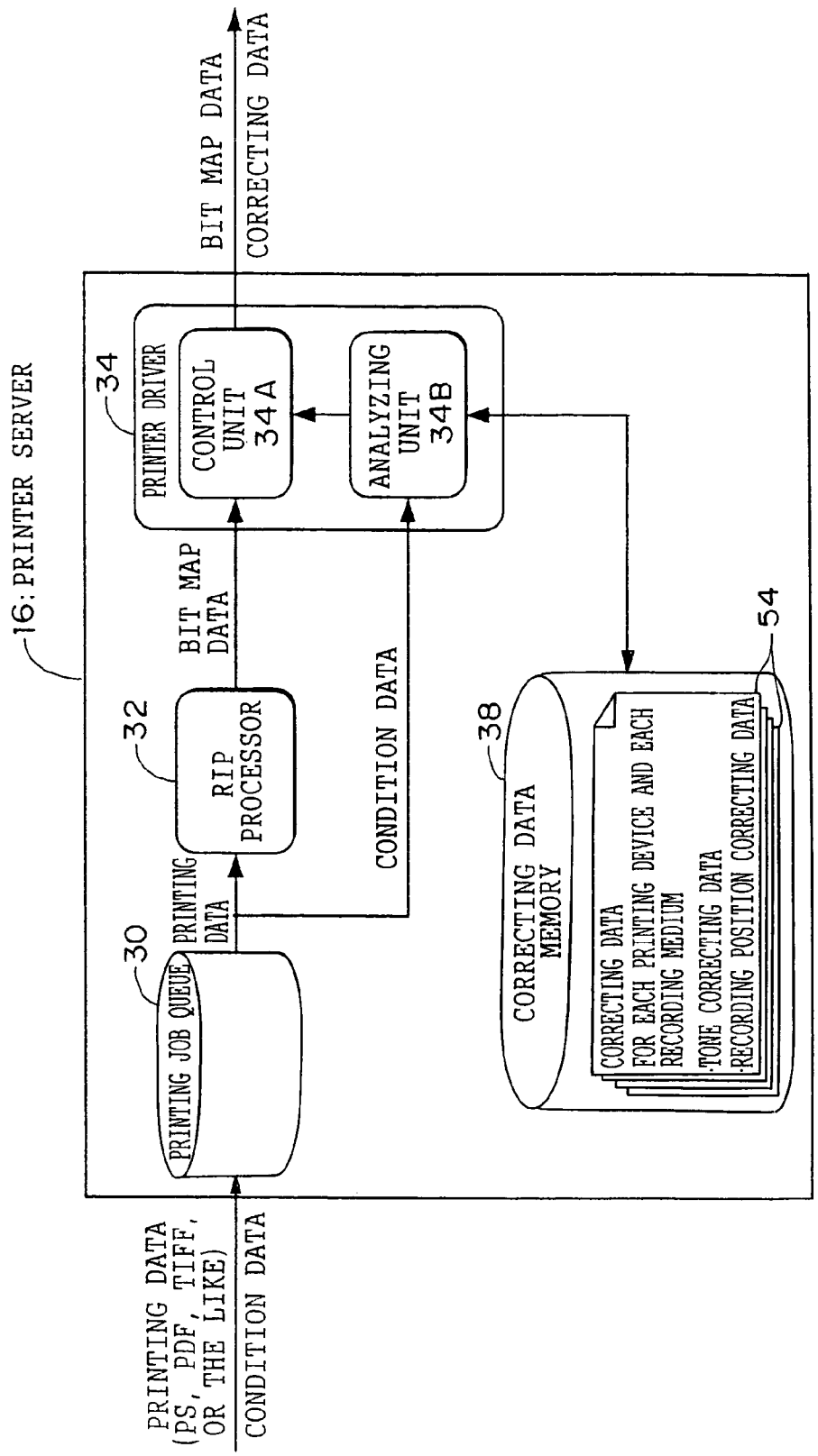
FIG. 2 is a constitutional diagram illustrating a function of a printer server.

The printer server 16 corresponds to the control device of the invention, and selects a printing device 12 to print the image based on the printing job 50 from the terminal device, so as to make the printing device 12 print the image based on the printing data. For this reason, as shown in FIG. 2, the printer server 16 has a printing job queue 30, an RIP processor 32, and a printer driver 34. The printing job queue 30 controls a printing process order of the printing job 50. The RIP processor 32 executes the RIP process on printing data included in the printing job 50 to be printed. The printer driver 34 controls the printing devices 12 to execute the printing process based on the printing job 50.

The printing job queue 30 is a First In First Out (FIFO)-type memory for queuing control for the printing jobs 50 transmitted from the terminal devices 14. That is to say, the printing jobs 50 transmitted from the terminal devices 14 are once registered in the printing job queue 30, and are read from the printing job queue 30 according to a registered order.

The RIP processor 32 corresponds to the conversion component of the invention, and executes the RIP process on printing data having PS, PDF or TIFF format included in the printing jobs 50 read from the printing job queue 30. The RIP processor 32 converts the printing data into bit map data 52 (see FIGS. 5 to 7). The resolution of the bit map data 52 obtained at this time becomes the resolution in the condition data included in the printing jobs 50. The RIP processor 32 outputs the bit map data 52 as the result of the RIP process to the printer driver 34.

The printer driver 34 has a control unit 34A and an analyzing unit 34B. The control unit 34A corresponds to the data transmission component of the invention, and the analyzing unit 34B corresponds to the selection component of the invention.

The control unit 34A can communicate with the printing devices 12, and transmits the bit map data 52 to the printing devices 12. The control unit 34A transmits the control data with a format capable of being analyzed by the printing devices 12 and instructs the printing devices 12 to print the bit map data 52.

The analyzing unit 34B analyzes the condition data included in the printing job 50 read from the printing job queue 30, and selects the printing device 12 to print the image based on the condition data. The analyzing unit 34B notifies the selected printing device 12 and contents of the printing process to be executed by the printing device 12 (a recording medium to be used, a number of prints, monochrome printing or color printing, and the like) to the control unit 34A. The control unit 34A transmits the bit map data 52 to the printing device 12 to print the image based on the notified contents, so as to instruct the printing device 12 to print the bit map data 52.

The analyzing unit 34B selects the printing devices 12 to print the image for the printing job 50 where the parallel process is specified in the condition data. The analyzing unit 34B determines allocation of parts of the entire printing process to be executed based on the printing job 50 (how many prints in all the prints, which page in all the pages, or the like) to the selected printing devices. The printing devices 12, which print images, are selected so as to adapt to the printing condition specified in the condition data.

The printer server 16 of the embodiment further has a correcting data memory 38 as a recording component of the invention. The correcting data memory 38 stores correcting data 54 for correcting a printing state of an image therein.

The correcting data 54 are obtained based on a result which is obtained in such a manner that the printing device 12 prints a test pattern image for predetermined calibration on a recording medium, and density of the printed test pattern image and a position on the recording medium are measured by a calibrator or the like. The correcting data 54 include tone correcting data for suitably adjusting a finished state of the image such as color shade, and recording position correcting data for suitably locating an image recording position on the recording medium.

In general, the printing state of the image such as the finished state of an image such as color shade and the image recording position on the recording medium varies with the printing devices 12. For this reason, the correcting data 54 should be prepared for at least each printing device 12. Even in one printing device 12, the printing state of an image varies with a type of recording media to be used. The case where the correcting data 54 are prepared individually for every type of recording media usable in the printing devices 12 in order to execute accurate correction is explained in detail below. That is to say, the correcting data memory 38 stores a plurality of the correcting data 54 for the printing device 12 and every types of the recording media therein.

The correcting data memory 38 is accessible from the analyzing unit 34B of the printer driver 34. The analyzing unit 34B selects and reads the correcting data 54 corresponding to the printing device 12 to print an image and a recording medium to be used for the printing process in the printing device 12 from the correcting data 54 stored in the correcting data memory 38. The analyzing unit 34B transmits the read correcting data 54 to the control unit 34A. As described above, correcting data 54 may be prepared for at least each printing device 12, and in this case, the correcting data 54 corresponding to the printing device 12 to print an image may be selected and read.

When the control unit 34A transmits the bit map data 52 to the printing device 12 to print an image, it transmits the correcting data 54 received from the analyzing unit 34B as well as the bit map data 52 to the selected printing device 12. Further, the control unit 34A can correct (correct tone and correct a recording position) the bit map data 52 based on the correcting data 54 according to the printing device 12 as transmission destination so as to transmit only the corrected bit map data 52.

The bit map data 52 (or the bit map data 52 and the correcting data) cannot be occasionally transmitted immediately because the printing device 12 is OFF or another bit map data 52 is being processed. For this reason, the printer server 16 has a memory for storing bit map data 52 waiting to be transmitted therein. When the bit map data 52 can be transmitted to the printing device 12 as transmission destination, they are read and transmitted from the memory. The bit map data 52 are held in the memory after transmission until the corresponding printing job 50 is ended due to after-mentioned error recovery.

As the printing device 12, for example, a printing plate exposing device such as a CTP (Computer to Plate) printing device, an on-demand printing device, a film setter device, a proof device, or the like can be used. The printing plate exposing device prints an image directly on a printing plate. The on-demand printing device prints an image directly on printing paper. The film setter device creates an original plate for creating a printing plate. The proof device prints a finally finished example of printing on printing paper. The printing device 12 prints and outputs the image based on the bit map data 52 transmitted from the printer server 16 on a recording medium (printing process).

Some printing devices 12 have a function for correcting the printing state of an image based on the bit map data 52 according to the correcting data 54 (hereinafter, this type of the printing devices are called as "the printing devices with the correcting function"). The correcting data as well as the bit map data 52 are transmitted from the printer server 16 to the printing devices 12 with the correcting function. When the printing device 12 with the correcting function receives the bit map data 52, it corrects the printing state based on the correcting data 54 received together with the bit map data 52, so as to print the bit map data 52.

A function of the embodiment is explained below. In the printing system 10 of the embodiment, data to be printed are specified by the operation of the terminal device 14 by the user, and various conditions at the time of printing are set, so that the printing of the data is instructed. When the user instructs the printing, the terminal device 14 converts the specified data into data with a format independent from the application so as to create printing data. The terminal device 14 transmits the printing data as well as the condition data representing the set conditions as the printing job 50 to the printer server 16.

When the printer server 16 receives the printing job 50 transmitted from the terminal device 14, it registers the received printing job 50 in the printing job queue 30.

When the printer server 16 receives the printing jobs 50 transmitted from the terminal devices 14, as described above, it once registers the received printing jobs 50 in the printing job queue 30, and reads the printing jobs 50 in a registered order. The printer server 16 executes a process shown in FIG. 3 for each printing job 50.

That is to say, when the printing job is read from the printing job queue 30 in the printer server 16, the RIP process is executed on the printing data included in the printing job 50 so that the printing data are converted into the bit map data 52 at step 100. At next step 102, the condition data included in the printing job 50 are analyzed, and a determination is made whether the parallel process is specified in the condition data. When the parallel process is specified in the condition data, the sequence proceeds from step 102 to step 104.

At step 104, the same kind of printing devices 12 which adapt to the condition data are selected as the printing device to print an image from the printing devices 12 connected to the printer server 16. Specifically, the same kind of printing devices 12 which can use a recording medium specified in the condition data and can execute specified monochrome printing or color printing with specified resolution are selected. This selection may be made by prestoring data representing the functions of the printing devices 12 in the memory of the printer server 16 and referring to the data. In another method, an inquiry is made at the printing devices 12 about their functions through communication, and the selection is made based on the responded result.

The same kind of printing devices can use the same bit map data, namely, their print engines (specifically, resolution, tone resolving power, and the like) are the same as one another.

At next step 106, in order that one printing job 50 is subject to the parallel process by the printing devices 12 selected at step 104, parts of the printing process to be executed based on the printing job 50 handled by the selected printing devices 12, respectively, are determined. The respective parts of the printing process to be executed based on the printing job 50 are allocated to the printing devices 12.

Specifically, for example, in the case of the printing job 50 for printing to output one image onto a plurality of recording media, namely, the printing job 50 where a number of prints specified in the condition data is plural, the printing process may be allocated to the selected printing devices 12 in units of a number of prints. In the case of the printing job 50 for printing to output a plurality of pages, namely, the printing job 50 which provides the bit map data 52 for a plurality of pages as a result of executing the RIP process on the printing data, the printing process may be allocated to the selected printing devices 12 in units of pages. Further, the allocation in units of a number of prints may be combined with the allocation in units of pages.

Figure 4:
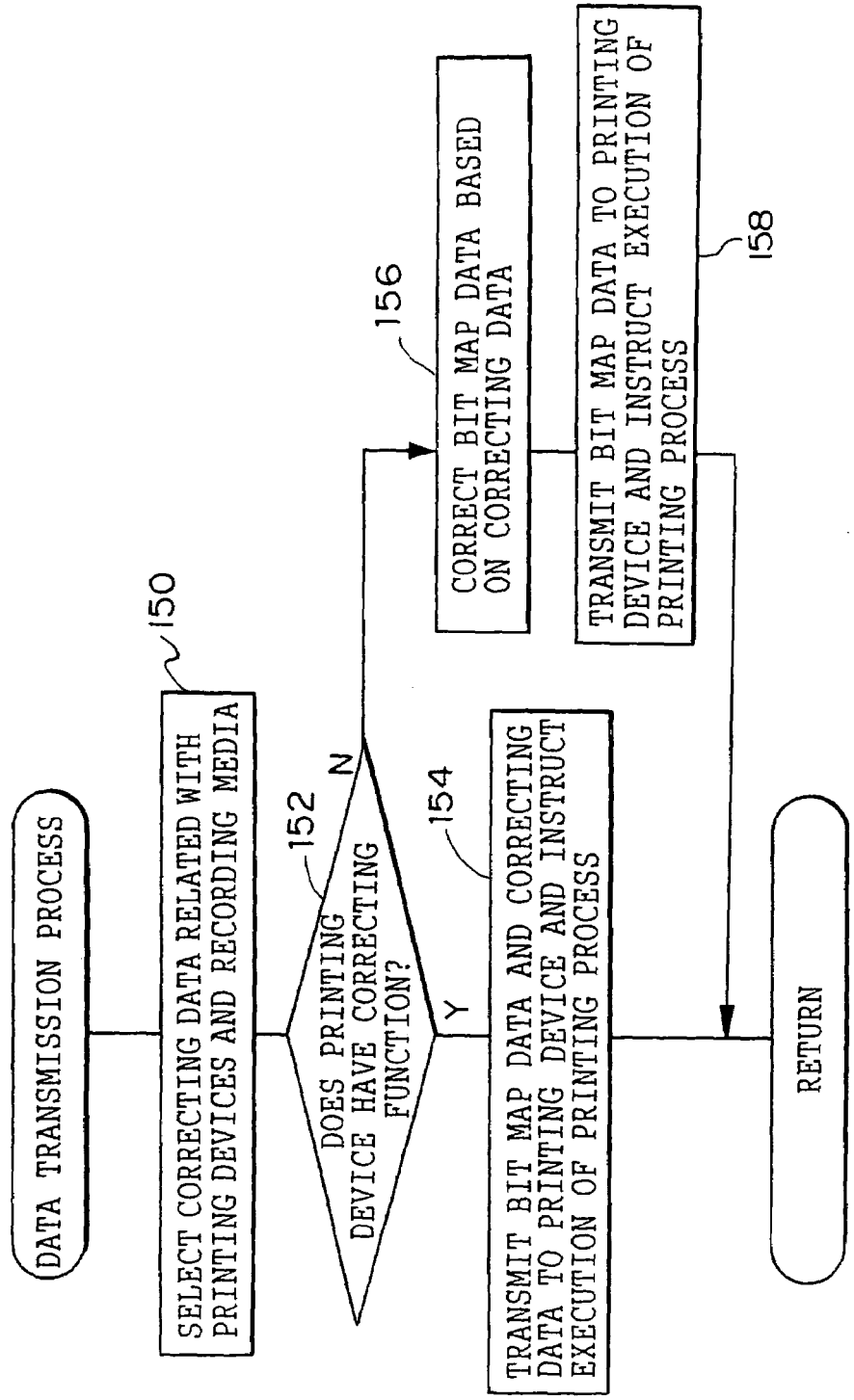
FIG. 4 is a flowchart illustrating a data transmission process (subroutine) executed in the printer server.

In order to make the selected printing devices 12 execute the respective parts of the printing process, each printing device 12 executes a data transmission process shown in FIG. 4 at next step 108. In the data transmission process, the correcting data 54, which are related with the selected printing devices 12 and the recording medium specified in the condition data (namely, the recording medium to be used for the printing process in the selected printing devices 12) at step 104, are selected from the correcting data 54 stored in the correcting data memory 38 at step 150.

At step 152, a determination is made whether the selected printing devices 12 are the printing devices having correcting function. This determination may be made by prestoring data representing the functions of the printing devices 12 in the memory and referring to the data. In another method, the determination is made based on a responded result obtained by inquiring at the printing devices 12 about that they have the correcting functions through communication.

In the case where the selected printing devices 12 have the correcting functions, the sequence proceeds from step 152 to step 154. At step 154, the bit map data 52 as the RIP processed result at step 100 and the correcting data selected at step 150 are transmitted to the printing devices 12 selected at step 104. The parts of the printing process which are handled by the printing device 12 are instructed to be executed. In this case, the printing devices 12 receive the bit map data 52 and the correcting data transmitted form the printer server 16, and corrects an image based on the correcting data when the image is printed based on the received bit map data 52. For this reason, the image based on the bit map data 52 is printed to be output from the printing devices 12 onto the recording medium in a printing state corrected based on the correcting data.

On the other hand, the selected printing devices 12 do not have the correcting function, the sequence proceeds from step 152 to step 156. At step 156, the bit map data 52 as the RIP processed result at step 100 is corrected based on the correcting data selected at step 150. At next step 158, the corrected bit map data 52 are transmitted to the printing devices 12 selected at step 104, and the printing devices 12 are instructed to execute the parts of the printing process, respectively. In this case, the printing device 12 receives the bit map data 52 transmitted from the printer server 16, and prints the received bit map data 52. Since the bit map data 52 are corrected based on the correcting data in advance on the printer server 16, an image based on the corrected bit map data 52 is printed to be output onto a recording medium from the printing devices 12.

Figure 3:
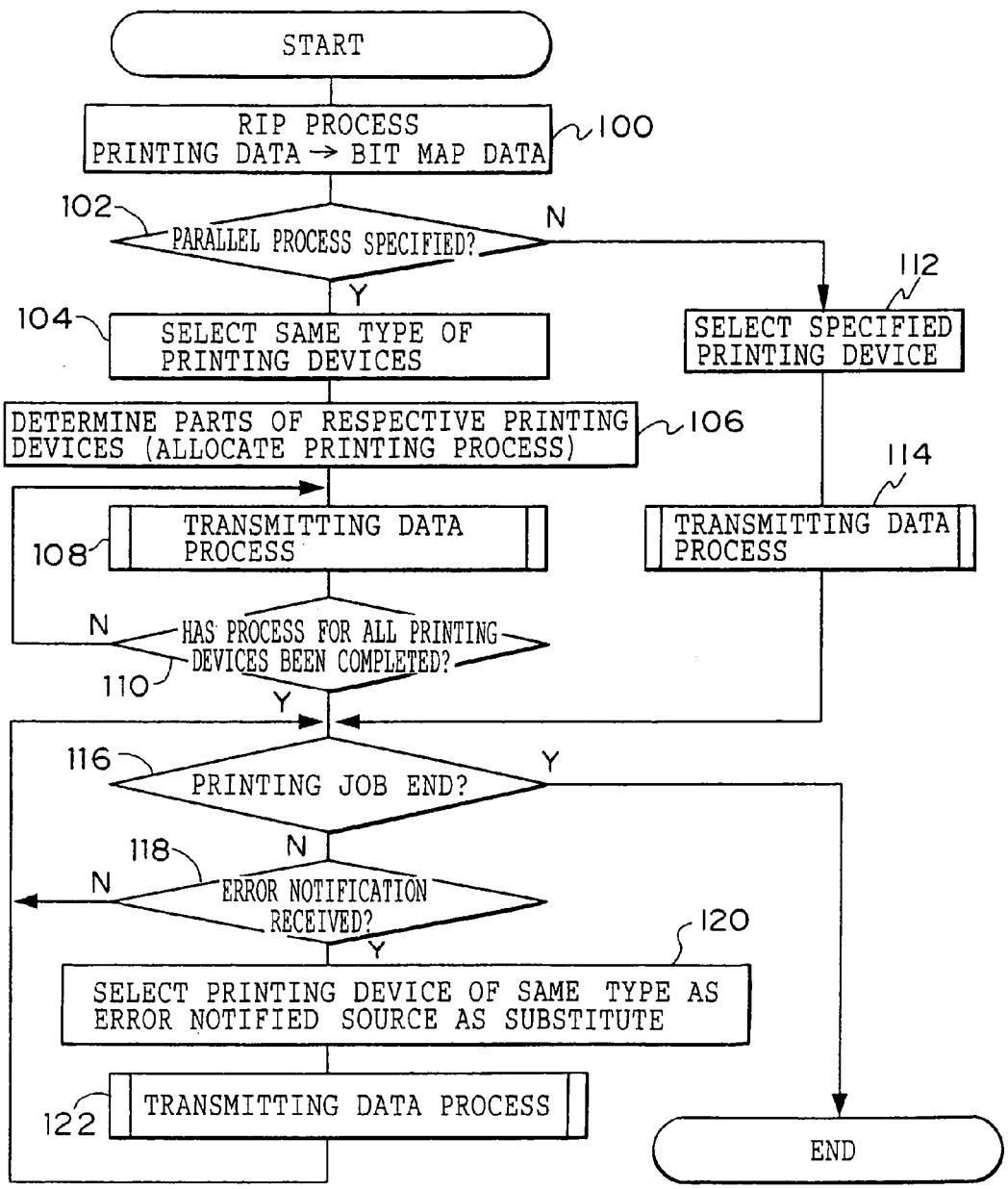
FIG. 3 is a flowchart illustrating a processing routine (main routine) executed for each printing job in the printer server.

After the bit map data 52 are transmitted and the printing process is instructed to be executed at steps 154 and 158, the sequence returns to the process in FIG. 3. When a printing device 12 in the printing devices 12 selected at step 104, which does not execute the data transmission process remains, the determination at step 110 is negative, and the sequence returns to step 108. The data transmission process in FIG. 4 is repeated, and when all the selected printing devices 12 complete the data transmission process, the determination at step 110 is affirmative, and the sequence goes to step 116 mentioned later. That is to say, in the case of the printing job 50 where the parallel process is specified in the condition data, the bit map data 52 (or the bit map data 52 and the correcting data) are transmitted to the same kind of the printing devices 12. The same kind of the printing devices 12 executes the parts of the printing process, respectively. As a result, the same kind of the printing devices 12 executes the printing job 50 in the parallel manner.

On the other hand, when the printing device to print the image is specified in the condition data, the sequence proceeds from step 102 to step 112, and the specified printing device is selected. In this case, the printing process to be executed based on the printing job 50 is handled only by the specified printing device 12 even in the case of the printing job 50 for printing to output the same image on a plurality of the recording media or the printing job 50 for printing to output a plurality of pages. For this reason, the step at which the parts in charge of the printing process are determined is skipped, and the data transmission process shown in FIG. 4 is executed at next step 114. When the data transmission process is completed, the sequence goes to step 116, mentioned later.

As a result, when the printing device to print an image is specified in the condition data, the bit map data 52 (or the bit map data 52 and the correcting data) are transmitted to the specified printing device 12. The bit map data 52 are printed, and thus the printing job 50 is executed only by the specified printing device 12.

When the printing process on the bit map data 52 is normally ended, the printing devices 12 transmit notification of end to the printer server 16, as a result of executing the instructed printing process. When an error occurs during the process and the printing process cannot be normally executed, the printing devices 12 transmit notification of error to the printer server 16.

At step 118, the printer server 16 waits for reception of the notification of end from all the printing devices 12 selected at step 104 or the printing device 12 selected at step 112. As a result, the printer server 16 determines whether the printing job 50 is ended. At this time, when any error occurs in any of the printing devices 12 and the printing process cannot be normally executed, not the notification of end but the notification of error is transmitted from the printing device 12 where the error occurs. When the printer server 16 receives the notification of error from any of the printing devices 12, the sequence goes from step 116 to steps 118 and 120.

At step 120, instead of the printing device 12 where the error occurs, a printing device 12 which is of the same type as the printing device 12 where the error occurs is selected. At this time, in the case of the printing job where the parallel process is specified, another printing device 12, which is executing the printing job simultaneously with the printing device 12 where the error occurs in the parallel manner, is selected. At next step 122, the data transmission process shown in FIG. 4 is executed.

As a result, the bit map data 52 (or the bit map data 52 and the correcting data related with the printing device 12 selected as substitute) are transmitted to the printing device 12 selected as substitute. The printing process which should be executed by the printing device 12 where the error occurs is executed alternatively by the selected printing device 12. That is to say, even when an error occurs in the printing device 12, the error can be recovered automatically. At this time, in the case of the printing job where the parallel process is specified, another printing device 12, which is executing the printing job simultaneously with the printing device 12 where the error occurs in the parallel manner, is selected as substitute. For this reason, a part of the printing job which is handled by the selected printing job 12 (a number of prints and a number of pages) is added, so that the error is recovered.

The information for notifying that the printing device 12 is changed due to an error is transmitted to the terminal device 14, so that that information may be notified to the user.

After the data transmission process is executed at step 122, the sequence returns to step 116, the printer server 16 waits for the end of the printing job, namely, waits for reception of the notification of end from the printing device 12. At this time, the printer server 16 waits for the reception of the notification of end from the printing device 12 selected as substitute at step 120 instead of the printing device 12 where the error occurs, so that the determination is made whether the printing job 50 is ended.

When the printer server 16 receives the notification of end from all the printing devices 12 selected at step 140 or the printing device 12 selected at step 112, the printing job 50 is ended. The determination at step 116 is, therefore, affirmative, and the process in FIG. 3 is ended.

In the printer server 16 according to the embodiment, the correcting data 54 for correcting the printing state of an image are prepared for at least each printing device 12 and are stored in the correcting data memory 38. When the printing job is input from the terminal device 14, the printing data 50 included in the printing job is subject to the RIP process by the RIP processor 32, so as to be converted into the bit map data 52. In the printer driver 34, the analyzing unit 34B selects the correcting data 54 related with the printing device to print an image, and the control unit 34A transmits the bit map data 52 and the correcting data 54 to the printing device 12. In another manner, the bit map data 52 are corrected based on the correcting data, and the corrected bit map data 52 are transmitted to the printing device 12. As a result, it is not necessary that the printing devices 12 execute the RIP process, so that the productivity of the printing system 10 can be improved and the printing device 12 can be simplified.

Figure 5:
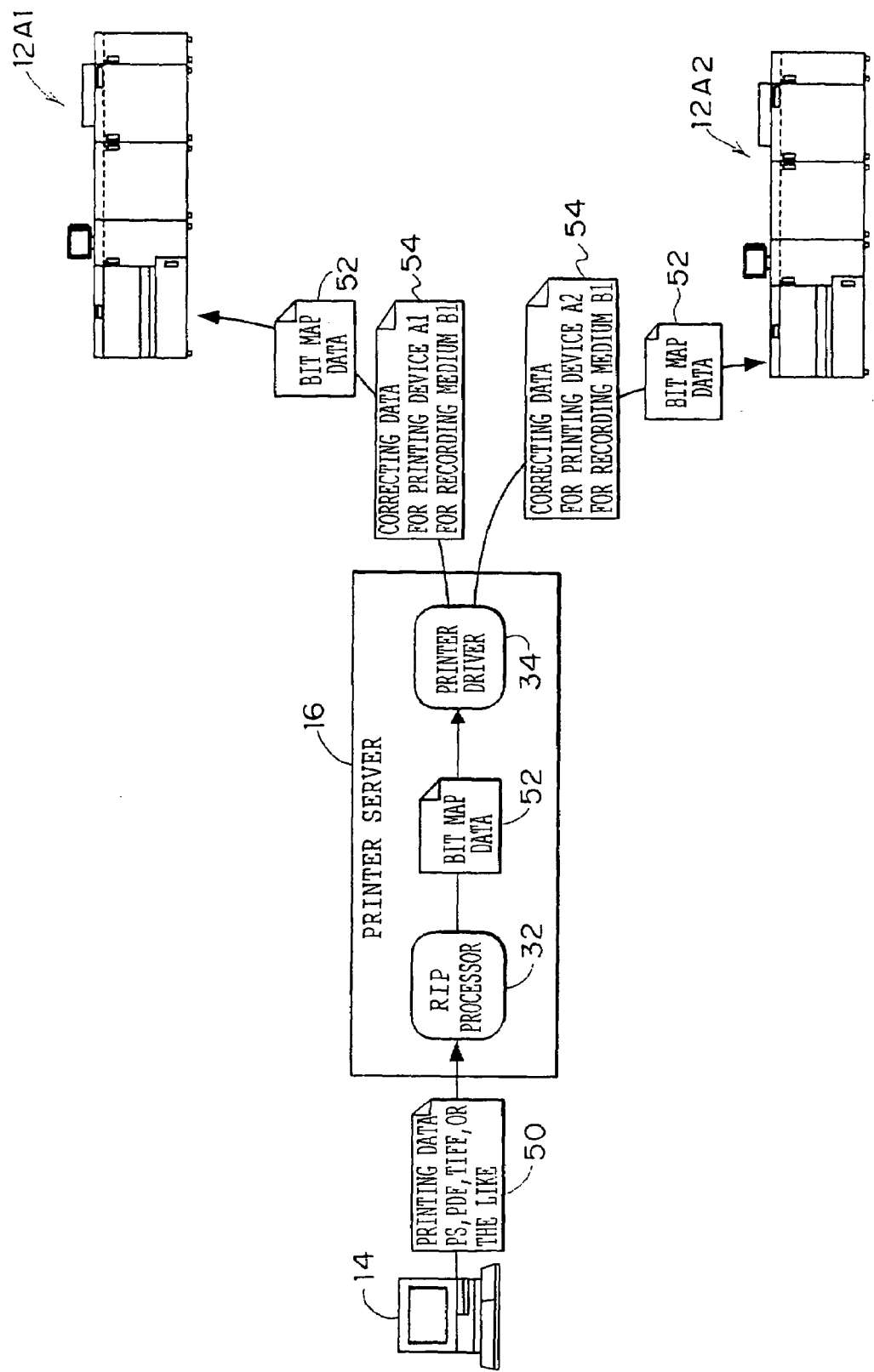
FIG. 5 is a conceptual diagram for explaining the operation of the printer server for the printing job where a parallel process is specified.
Figure 6:
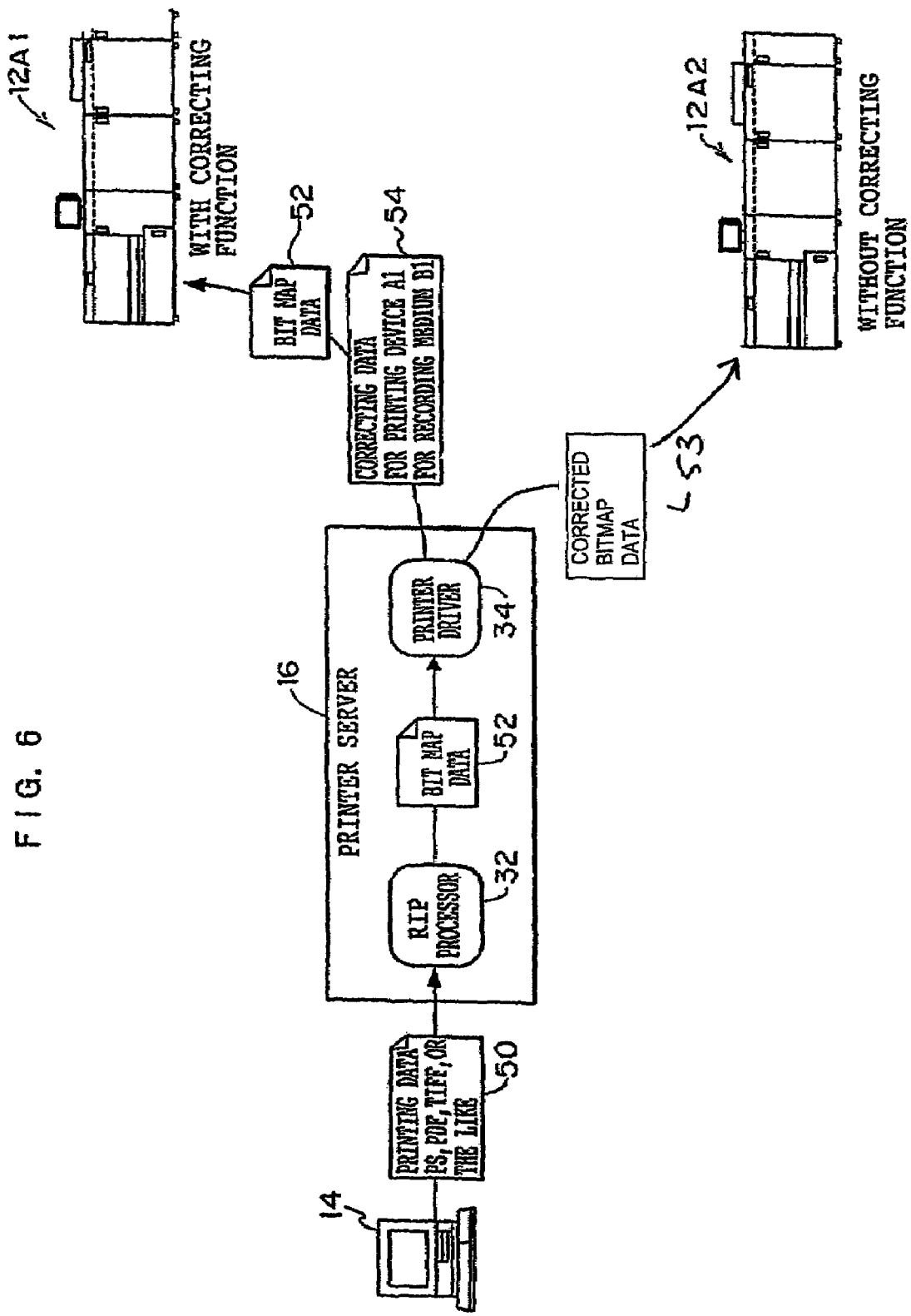
FIG. 6 is a conceptual diagram for explaining the operation of the printer server in the case where the printing devices for printing an image include a printing device without a correcting function.

Examples where the printing devices 12 execute the printing job in the parallel manner as shown in FIGS. 5 to 7 are explained in detail below. FIGS. 5 to 7 are the diagrams illustrating the examples where two printing devices 12A1 and 12A2 execute the parallel process, and in order to discriminate them, A1 and A2 are given to the ends of the reference numerals. FIGS. 5 to 7 are the diagrams illustrating the case where a recording medium B1 is used for the printing process.

As shown in FIG. 5, in the printer server 16, the printing data input from the terminal device 14 is subject to the RIP process by the RIP processor 32 so as to be converted into the bit map data 52. The bit map data 52 are transmitted from the printer driver 34 to the same kind of the two printing devices 12A1 and 12A2. The correcting data 54 related with the printing device 12A1 and the correcting data 54 related with the printing device 12A2 are selected, and they are transmitted together with the bit map data 52. When the printing devices 12A1 and 12A2 print the transmitted bit map data 52, the printing state is corrected based on the correcting data 54 transmitted together with the bit map data 52.

As a result, in the printing devices 12A1 and 12A2 which execute the parallel process, even when the printing state of an image differs from each other, the printing devices 12 do not execute the RIP process. Printed results having the same quality which are corrected according to the printing states of an image can be obtained, so that the function for executing the RIP process is eliminated and the printing devices 12 can be simplified. Since the printing devices 12A1 and 12A2 are of the same type, they may execute the RIP process in common. In other words, when the parallel process is executed, the same kind of printing devices are selected as the printing device to print an image, so that each printing device 12 does not have to execute the RIP process. For this reason, a processing load on the control device 16 can be reduced.

As shown in FIG. 6, when the printing device 12A2 does not have the correcting function, the printer server 16 corrects the bit map data 52 using the correcting data 54 related with the printing device 12A2. Only the corrected bit map data 53 are transmitted to the printing device 12A2.

As a result, even when the printing device 12 does not have the correcting function, the printed result which is corrected according to the printing state of the printing device can be obtained. In other words, in a conventional system, the printing device 12 requires a correcting function for making a correction according to a printing state of an image as well as the RIP process. The bit map data 52 are, however, corrected by the correcting data 54 as mentioned above, and the corrected bit map data 53 are transmitted so that the correcting function can be also omitted. That is to say, the printing device 12 may have only a minimal function for printing the bit map data 52, so that the printing device 12 can be further simplified.

As shown in FIG. 7, the printer server 16 transmits the bit map data 52 and the correcting data 54 related with the printing device 12A1 (or the bit map data 52 corrected using the correcting data 54) to the printing device 12A1 (see an arrow (1)). Thereafter, when an error occurs in the selected printing device 12A1 and the printer server 16 receives the notification of error (see an arrow (2)), the printer server 16 transmits the bit map data 52 and the correcting data 54 related with the printing device 12A2 to the printing device 12A2 which is another printing device 12 of the same kind as the printing device 12A2 where the error occurs (see an arrow (3)).

As a result, the printing process which cannot be executed due to the error can be executed by another printing device 12 alternatively. Since a printing device 12 of the same kind of the printing device 12 where the error occurs is selected as substitute, the bit map data 52 transmitted to the printing device 12 where the error occurs can be used for the printing process in the printing device 12 selected as substitute. That is to say, since the RIP process should not be executed again for the printing device 12 selected as substitute, the processing load on the control device 16 can be reduced.

FIG. 7 is the diagram illustrating the case where the other printing device which executes the substitute process. When the other printing device 12 does not have the correcting function, however, the printer server 16 corrects the bit map data 52 using the correcting data 54 related with the other printing device 12. The corrected bit map data 52 may be transmitted.

In the above explanation, the printing system where the printing device 12 with the correcting function and the printing device 12 without the correcting function are present in a mixed manner is supposed. In the printer server 16, a determination is made whether the printing device 12 to print an image has the correcting function, and when the printing device 12 has the correcting function, the bit map data 52 and the correcting data 54 are transmitted. When the printing device 12 does not have the correcting function, the bit map data 52 are corrected based on the correcting data 54, and the corrected bit map data 52 are transmitted. The invention is not, however, limited to this. When only the printing devices 12 with the correcting function (or without the correcting function) are provided in the printing system 10, the determination whether the printing device 12 has the correcting function or not (step 152 in FIG. 4) is omitted. The bit map data 52 and the correcting data 54 (or the bit map data 52 corrected by the correcting data 54) may be transmitted.

In the above explanation, the example where the printing device 12 to print an image is selected from the printing devices 12 connected to the printer server 16 is explained. The invention is not, however, limited to this. For example, the printing system 10 is composed only for the parallel process, and when the printing job is input thereinto, all the printing devices 12 connected to the printer server 16 may print an image.

In the above explanation, the example where the correcting data 54 related with all the printing devices 12 are stored in the correcting data memory 38 of the printer server 16 is explained. The invention is not, however, limited to this. For example, as shown in FIG. 8, a remote PC 60 is provided on the network which connects a printing device 12 (hereinafter, a printing device 12A3) in the printing devices 12 to the printer server 16. A memory 62 such as HDD provided in the remote PC 60 is used as the correcting data memory, and the correcting data 54 related with the printing device 12A3 with respect to each recording medium may be stored in the memory 62. In this case, the control device of the invention is constituted by the printer server 16 and the remote PC 60.

In this case, when the printer server 16 selects the printing device 12A3 as the printing device to print an image, it transmits the bit map data 52 to the remote PC 60 so that the printing process is executed. The remote PC 60 selects the correcting data 54 related with the recording medium to be used for the printing process from the memory 62, and may transmit the selected correcting data 54 as well as the bit map data 52 transmitted from the printer server 16 to the printing device 12A3. When the printing device 12A3 does not have the correcting function, the remote PC 60 corrects the bit map data 52 transmitted from the printer server 16 using the selected correcting data 54 so as to transmit them to the printing device 12A3.

The remote PC 60 requires functions like a selection unit and a printer driver. The selection unit selects the correcting data 54 related with the recording medium to be used for the printing process based on the instruction to execute the printing process from the printer server 16. The printer driver transmits the bit map data (or the bit map data and the correcting data) to the printer 12A3. These functions can be, however, structured easily by executing programs.

What is claimed is:

1. A printing control method of making a plurality of printing devices, for printing an image on a recording medium, print an image based on printing data representing the image to be printed with a control device connected to the printing devices, the printing control method comprising:
   (a) obtaining and storing a plurality of correcting data in advance for correcting a printing state of the image at the time of printing for each of the printing devices;
   (b) inputting the printing data from an external source;
   (c) converting the input printing data into data with a data format capable of being printed by the printing devices;
   (d) selecting correcting data related to a printing device to print the image based on the printing data from the stored correcting data by a selection component, wherein if the plurality of printing devices are made to print the image based on the printing data in a parallel process, the selection component selects a same type of printing device from the plurality of printing devices to print the image based on the printing data, the selection component selects the correcting data for each of the selected printing devices, and the plurality of printing devices operate simultaneously to print a common image output in parallel; and
   (e) transmitting the converted printing data and the selected correcting data, or corrected printing data which are obtained by correcting the converted printing data based on the selected correcting data to the plurality of printing devices to print the image based on the printing data.

2. The printing control method of claim 1, wherein when the plurality of printing devices are made to print the image in a parallel process based on the printing data, a plurality of the same type of printing devices are selected from the plurality of printing devices to each print the image based on the printing data in (d), and the correcting data are selected for each of the selected printing devices.

3. The printing control method of claim 1, wherein when an error occurs in the printing device for printing the image based on the printing data,
   a printing device that is the same type as the printing device in which the error occurred is selected as a substitute therefore, and the correcting data corresponding to the printing device selected as the substitute are selected, and one of the converted printing data and the correcting data corresponding to the printing device selected as a substitute, and, the corrected printing data that is corrected based on the correcting data corresponding to the printing device selected as a substitute, are transmitted to the printing device selected as the substitute.

4. The printing control method of claim 1, wherein, in (e), a determination is made regarding whether the printing devices for printing the image based on the printing data have a correcting function for correcting the printing state based on the correcting data, and when the printing devices for printing the image based on the printing data have the correcting function, the converted printing data and the selected correcting data are transmitted, and when the printing devices for printing the image based on the printing data do not have the correcting function, the corrected printing data corrected based on the correcting data are transmitted.

5. The printing control method of claim 1, wherein, in (a), the correcting data for each of the printing devices and each type of recording media are stored in advance, and in (d), the correcting data corresponding to the printing device that prints the image based on the printing data and to the recording medium to be used for the printing are selected.

6. The printing control method of claim 5, wherein the correcting data of each type of the recording media corrects color shade and image recording position on the recording medium.

7. A control device that is connected to a plurality of printing devices for printing an image on a recording medium and controls the plurality of printing devices for printing the image based on printing data representing the image to be printed input from an external source, the control device comprising:

a conversion component for converting the printing data into data with a data format capable of being printed by the plurality of printing devices;

a storage component for obtaining and storing a plurality of correcting data for correcting a printing state of the image at the time of printing for each of the plurality of printing devices;

a selection component for selecting correcting data related with the plurality of printing devices to print the image based on the printing data from the correcting data stored in the storage component, wherein if the plurality of printing devices are made to print the image based on the printing data in a parallel process, the selection component selects a same type of printing device from the plurality of printing devices to print the image based on the printing data, the selection component selects the correcting data for each of the selected printing devices, and the plurality of printing devices operate simultaneously to print a common image output in parallel; and a data transmission component for transmitting the printing data converted by the conversion component and the correcting data selected by the selection component, or corrected printing data which are obtained by correcting the. printing data converted by the conversion component based on the correcting data selected by the selection component to the plurality of printing devices to print the image based on the printing data.

8. The control device of claim 7, wherein when an error occurs in a printing device that prints the image based on the printing data, the selection component selects a printing device that is the same type as the printing device in which the error occurred as a substitute therefore, and selects correcting data corresponding to the printing device selected as the substitute, and the data transmission component transmits, to the printing device selected as substitute, one of the converted printing data and the correcting data corresponding to the printing device selected as a substitute, and the corrected printing data obtained by correcting the converted printing data based on the correcting data corresponding to the printing device selected as the substitute.

9. The control device of claim 7, wherein the data transmission component determines whether the printing devices for printing the image based on the printing data have a correcting function for correcting the printing state based on the correcting data, and when the printing devices for printing the image based on the printing data have the correcting function, transmits the converted printing data and the selected correcting data, and when the printing devices for printing the image based on the printing data do not have the correcting function, transmits the printing data corrected based on the correcting data.

10. The control device of claim 7, wherein the storage component obtains the correcting data for each of the printing devices and each type of recording media and stores them in advance, the selecting component selects the correcting data corresponding to the printing devices for printing the image based on the printing data and the recording media used for the printing.

11. The printing control method of claim 10, wherein the correcting data of each type of the recording media corrects color shade and image recording position on the recording medium.

12. The control device of claim 7, wherein the conversion component, the storage component, the selection component, and the data transmission component are housed in a printer server.

13. A printing system comprising:

a plurality of printing devices for printing an image on recording media; and a control device, which is connected to the printing devices for printing the image on the recording media and controls the printing devices to print the image based on printing data that is inputted from an external source and represents the image to be printed, wherein the control device comprises:

a conversion component for converting the printing data into a format capable of being printed by the printing devices;

a storage component for obtaining and storing a plurality of correcting data for correcting a printing state of the image at the time of printing for each of the printing devices;

a selection component for selecting, from the plurality of correcting data stored in the storage component, correcting data corresponding to the printing devices for printing the image based on the printing data, wherein if the plurality of printing devices are made to print the image based on the printing data in a parallel process, the selection component selects a same type of printing device from the plurality of printing devices to print the image based on the printing data, the selection component selects the correcting data for each of the selected printing devices, and the plurality of printing devices operate simultaneously to print a common image output in parallel; and a data transmission component for transmitting, to the printing devices that print the image based on the printing data, one of the printing data converted by the conversion component and the correcting data selected by the selection component, and corrected printing data obtained by correcting the printing data converted by the conversion component based on the correcting data selected by the selection component.

14. The printing system of claim 13, wherein when the printing devices are made to print the image based on the printing data in a parallel process, the selection component selects a plurality of the same type of printing devices from the plurality of printing devices to each print the image based on the printing data, and selects the correcting data for each of the selected printing devices.

15. The printing system of claim 13, wherein when an error occurs in a printing device that prints the image based on the printing data, the selection component selects a printing device that is same type as the printing device in which the error occurred as a substitute thereof, and selects correcting data corresponding to the printing device selected as the substitute; and the data transmission component transmits one of the converted printing data and the correcting data corresponding to the printing device selected as the substitute, and the corrected printing data corrected based on the correcting data corresponding to the printing device selected as the substitute.

16. The printing system of claim 13, wherein the data transmission component determines whether the printing devices for printing the image based on the printing data have a correcting function for correcting the printing state based on the correcting data, and when the printing devices for printing the image based on the printing data have the correcting function, transmits the converted printing data and the selected correcting data, and when the printing devices for printing the image based on the printing data do not have the correcting function, transmits the printing data corrected based on the correcting data.

17. The printing system of claim 13, wherein the correcting data are obtained for each of the printing devices and each type of recording media so as to be stored in advance, and the selection component selects the correcting data corresponding to the printing devices for printing the image based on the printing data and the recording media used for the printing.

18. The printing control method of claim 17, wherein the correcting data of each type of the recording media corrects color shade and image recording position on the recording medium.

19. A control device that is connected to a plurality of printing devices for printing an image on a recording medium and controls the plurality of printing devices for printing the image based on printing data representing the image to be printed input from an external source, the control device comprising:

a conversion component for converting the printing data into data with a data format capable of being printed by the plurality of printing devices;

a storage component for obtaining and storing a plurality of correcting data for correcting a printing state of the image at the time of printing for each of the plurality of printing devices;

a selection component for selecting correcting data related with the plurality of printing devices to print the image based on the printing data from the correcting data stored in the storage component; and a data transmission component for transmitting the printing data converted by the conversion component and the correcting data selected by the selection component, or corrected printing data which are obtained by correcting the printing data converted by the conversion component based on the correcting data selected by the selection component to the plurality of printing devices to print the image based on the printing data, wherein the data transmission component comprises a data transmission means for transmitting the printing data converted by the conversion component and the correcting data selected by the selecting component to the plurality of printing devices operating simultaneously in conjunction with the control device.

* * * * *